United States Patent
Ness et al.

(10) Patent No.: US 9,228,531 B2
(45) Date of Patent: Jan. 5, 2016

(54) PISTON HAVING COMBUSTION BOWL AND ENGINE USING SAME

(71) Applicant: Caterpillar Inc., Peoria, IL (US)

(72) Inventors: Aaron Ness, Lafayette, IN (US); Scott Coulier, Peoria, IL (US); Thomas Kammerdiener, Graz (AT); Jonathan Kilkenny, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 298 days.

(21) Appl. No.: 13/892,396

(22) Filed: May 13, 2013

(65) Prior Publication Data

US 2014/0331961 A1    Nov. 13, 2014

(51) Int. Cl.
| | |
|---|---|
| *F02F 3/00* | (2006.01) |
| *F02F 3/24* | (2006.01) |
| *F02F 3/26* | (2006.01) |
| *F02F 3/28* | (2006.01) |
| *F02F 3/22* | (2006.01) |

(52) U.S. Cl.
CPC ... *F02F 3/28* (2013.01); *F02F 3/00* (2013.01); *F02F 3/22* (2013.01); *F05C 2201/021* (2013.01)

(58) Field of Classification Search
CPC ............. F05C 2201/021; F05C 2201/0448; F02F 3/22; F02B 19/14; F02B 23/04; F02B 3/06; F02B 23/08; F02B 23/0672

USPC ...................... 123/193.6, 269, 279
See application file for complete search history.

(56) References Cited

U.S. PATENT DOCUMENTS

| | | | |
|---|---|---|---|
| 5,970,946 | A | 10/1999 | Shea et al. |
| 6,732,703 | B2 | 5/2004 | Eckerle et al. |
| 6,966,294 | B2 | 11/2005 | Eckerle et al. |
| 7,025,031 | B2 | 4/2006 | Mahakul et al. |
| 7,131,418 | B2 | 11/2006 | Wieland |
| 7,210,448 | B2 * | 5/2007 | Stanton et al. ............... 123/298 |
| 2006/0070603 | A1 * | 4/2006 | Stanton et al. ............... 123/298 |
| 2011/0253096 | A1 | 10/2011 | Easley |
| 2012/0160205 | A1 * | 6/2012 | Gladden et al. ............ 123/193.6 |

* cited by examiner

*Primary Examiner* — Lindsay Low
*Assistant Examiner* — Syed O Hasan
(74) *Attorney, Agent, or Firm* — Baker & Hostetler LLP

(57) ABSTRACT

A piston for balancing combustion efficiency and smoke generation with NOx production includes a combustion face forming a combustion bowl having a compound curvature increased in sharpness in a radially outward direction. An outer bowl surface defines a large radius of curvature adjacent an inner bowl surface, and a medium radius of curvature adjacent a cylindrical wall surface. The inner bowl, outer bowl, and wall surfaces together contour the combustion bowl, such that a diameter of the combustion bowl is about 124 mm so as to establish a bowl to bore ratio of about 0.71 in a direct injection compression ignition engine with a compression ratio of about 15:1 to 17:1.

14 Claims, 2 Drawing Sheets

PISTON HAVING COMBUSTION BOWL AND ENGINE USING SAME

TECHNICAL FIELD

The present disclosure relates generally to pistons of the type used in compression ignition internal combustion engines, and relates more particularly to a piston combustion face having a combustion bowl contoured to establish a predefined bowl to cylinder bore ratio in the engine for balancing combustion efficiency and smoke generation with NOx production.

BACKGROUND

A wide variety of operating strategies, and component geometries are known in the field of internal combustion engines. Engineers have experimented for decades with different ways to operate fueling, exhaust, intake, and other engine systems, and different ways to shape and proportion engine components. One motivation behind such experimentation has been balancing the often competing concerns of reducing certain emissions in the engine exhaust, and optimizing efficiency. Internal combustion engines typically burn air and a hydrocarbon fuel. Combustion of the fuel and air produces exhaust from the internal combustion engine, which can include a variety of compounds and materials such as soot, ash, unburned hydrocarbons, water, carbon dioxide, carbon monoxide, and various other organic and inorganic species.

In recent years, the reduction in emissions of oxides of nitrogen, collectively referred to as "NOx", and the reduction of particulate matter which generally includes soot and ash, has been of particular focus in internal combustion engine research. Unfortunately, reducing these undesirable exhaust constituents often comes at the expense of efficiency properties such as fuel efficiency and/or attainable engine speed or power. As noted above, component shapes and operating parameters of the engine have been varied in almost innumerable ways over the years. One area of particular focus has involved attempts to shape a piston combustion face in such a way that certain exhaust emissions are reduced, without sacrificing efficiency.

One common piston design directed to reducing emissions without sacrificing efficiency unduly, includes a combustion bowl defined by the combustion face of the piston which is exposed to and defines a portion of the engine combustion chamber. It is believed that a combustion bowl may affect the flow and combustion properties of gases and atomized liquid fuel during a combustion event in such a way that the make-up of the combustion products can be tailored for various purposes. As mentioned above, it is often desirable to reduce NOx and particulate matter without unduly affecting combustion efficiency.

Currently, despite the development of numerous research and commercial designs for piston combustion bowls, the science of combustion as it relates to bowl shape or combinations of shapes during a combustion event is not fully understood. It is well known that even relatively minor modifications to combustion bowl geometry can have significant effects on the type and relative proportions of combustion products. Due to this lack of sufficient understanding, the art provides relatively little guidance on how to achieve any specific set of goals. Engineers have discovered many different variables which they know will have some effect on emissions and/or efficiency, but the grouping of these variables and other factors do not often result in satisfactory and predictable results. Developing a suitable design often requires years of research and development including thorough application, testing and field analysis. One specialized piston design is known from U.S. Pat. No. 7,025,031 to Mahakul et al.

SUMMARY

In one aspect, a piston is provided, for balancing combustion efficiency and smoke generation with NOx production in a direction compression ignition internal combustion engine having a cylinder bore of about 175 mm. The piston includes a piston body defining a longitudinal axis extending between a first axial body end and a second axial body end, and including an outer body surface extending between the first and second axial body ends, and a combustion face upon the first axial body end. The combustion face forms a combustion bowl and includes a conical inner bowl surface, and a concave outer bowl surface extending from the inner bowl surface to a cylindrical wall surface and having a compound curvature increased in sharpness in a radially outward direction. The combustion face further forms an annular piston rim extending circumferentially around the combustion bowl, and including a planar rim surface, and a convex lip surface transitioning between the rim surface and the wall surface and having an intersection with the wall surface that defines a boundary of the combustion bowl. The outer bowl surface defines a large radius of curvature adjacent the inner bowl surface, and a medium radius of curvature adjacent the wall surface, and the lip surface defines a small radius of curvature, each in a longitudinal section plane. The inner bowl, outer bowl, and wall surfaces together contour the combustion bowl, such that a diameter of the combustion bowl is about 124 mm and a volume of the combustion bowl is about 190 $cm^3$ so as to establish a bowl to bore ratio of about 0.71 and a compression ratio of about 15:1 to 17:1 when the piston is installed for service in the internal combustion engine.

In another aspect, a direct injection compression ignition internal combustion engine includes an engine housing defining a cylinder bore having a cylinder bore diameter of about 175 mm, and including an intake passage and an exhaust passage each being in fluid communication with the cylinder bore. A cylinder head is coupled with the engine housing, and a fuel injector is mounted in the cylinder head and configured to directly inject a fuel into the cylinder. A piston is positioned within the cylinder bore and includes a piston body defining a longitudinal axis extending between a first axial body end and a second axial body end, and including an outer body surface extending between the first and second axial body ends, and a combustion face upon the first axial body end. The combustion face forms a combustion bowl and includes a conical inner bowl surface, and a concave outer bowl surface extending from the inner bowl surface to a cylindrical wall surface and having a compound curvature increased in sharpness in a radially outward direction. The combustion face further forms an annular piston rim extending circumferentially around the combustion bowl, and including a planar rim surface, and a convex lip surface transitioning between the planar rim surface and the wall surface and having an intersection with the wall surface that defines a boundary of the combustion bowl. The outer bowl surface defines a large radius of curvature adjacent the inner bowl surface, and a medium radius of curvature adjacent the wall surface, and the lip surface defines a small radius of curvature, each in a longitudinal section plane. The inner bowl, outer bowl, and wall surfaces together contour the combustion bowl, such that a ratio of a diameter of the combustion bowl to the bore diameter is about 0.71, and a volume of the combustion bowl is about 190 cm³ to yield a compression ratio in the internal combustion engine of 15:1 to 17:1.

DETAILED DESCRIPTION

Figure 1:
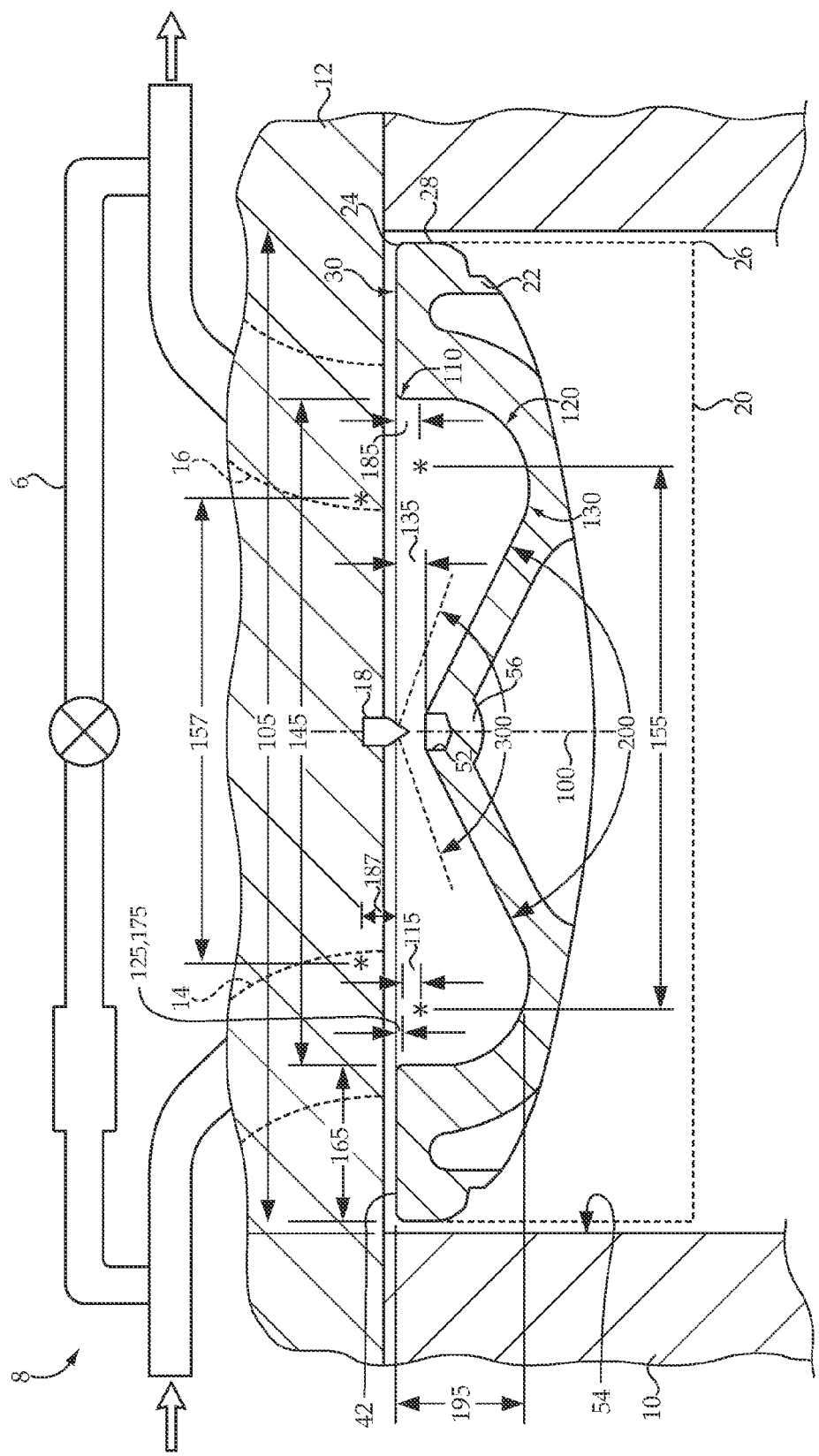
FIG. 1 is a partially sectioned diagrammatic view of an engine, according to one embodiment.

Referring to FIG. 1, there is shown an engine 8 according to one embodiment. Engine 8 includes an engine housing 10, a cylinder head 12 coupled to engine housing 10, and an intake passage 14 and exhaust passage 16 each formed in cylinder head 12 in a generally conventional manner. Engine 8 includes a direct injection compression ignition internal combustion engine, having a fuel injector 18 positioned at least partially within an engine cylinder 54. Cylinder 54 is defined by engine housing 10 and is in fluid communication with intake and exhaust passages 14 and 16, though engine valves (not shown) will be used to make such fluid communication controllable. In a practical implementation strategy cylinder 54 will be defined by a cylinder liner (not shown) positioned within engine housing 10. Cylinder 54 may have a cylinder bore diameter of about 175 millimeters (mm). A piston 20 is positioned within cylinder bore 54, and configured for balancing combustion efficiency and smoke generation with NOx production in engine 8. As will be further apparent from the following description, various features of piston 20 are specially configured for attaining desired combustion efficiency, smoke generation and NOx production in engine 8 in combination with the cylinder bore size of about 175 mm and a compression ratio of 15:1 to 17:1 in engine 8.

Figure 2:
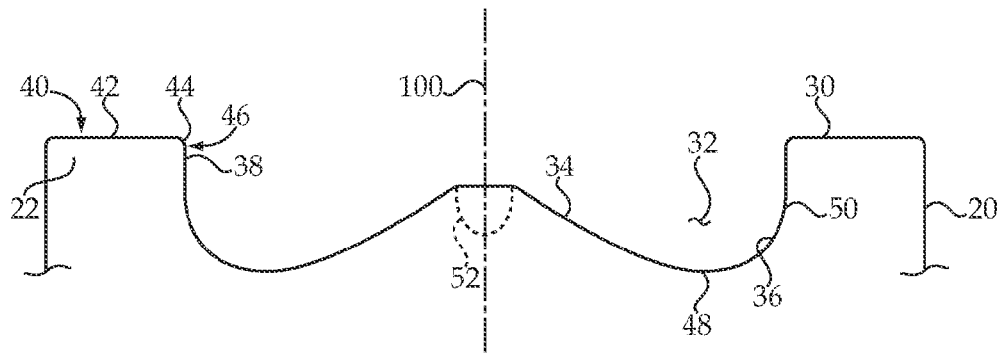
FIG. 2 is a diagrammatic view of a profile of a piston from the engine of FIG. 1.

Referring also to FIG. 2, there is shown a profile of piston 20, and including reference numerals to identify various features of piston 20 which otherwise would be difficult to show in FIG. 1. Respecting piston 20, FIG. 1 may be understood to primarily include reference numerals pointing out dimensional, angular, and proportional attributes, whereas FIG. 2 includes reference numerals primarily identifying physical features such as surfaces. Piston 20 may include a piston body 22 defining a longitudinal axis 100 extending between a first axial body end 24 and a second axial body end 26. Piston body 22 includes an outer body surface 28, which is substantially cylindrical but might have a minor ovality, extending between first and second axial body ends 24 and 26, and a combustion face 30 upon first axial body end 24. Piston 20 may also include a piston skirt at second axial body end 26, and typical wrist pin hardware, neither of which are specifically illustrated in FIG. 1, for guidance within cylinder bore 54 and coupling with a piston rod in a conventional manner. Piston 20 may be a one-piece piston but could conceivably be constructed from separate crown and skirt components. A bore 52 may be provided to receive a threaded lifting member, and a bump 56 opposite bore 52 provides extra material for structural integrity.

Combustion face 30 forms a combustion bowl 32, and includes a conical inner bowl surface 34, and a concave outer bowl surface 36 extending from inner bowl surface 34 to a cylindrical wall surface 38. The profile of combustion face 30 shown in the longitudinal section plane of FIGS. 1 and 2 is a profile of rotation, and will thus be understood to be the same through 360° of rotation about axis 100. In the longitudinal section plane the profile is symmetric about axis 100. Outer bowl surface 36 has a compound curvature increased in sharpness in a radially outward direction. Combustion face 30 further forms an annular piston rim 40 extending circumferentially around combustion bowl 32, and including a planar rim surface 42. A convex lip surface 44 of rim 40 transitions between rim surface 42 and wall surface 38, and has an intersection 48 with wall surface 38 that defines a boundary of combustion bowl 32. Another way to understand this feature is that at the point at which cylindrical wall surface 46 transitions to, and blends with, lip surface 44, that point of intersection can be understood as a boundary of combustion bowl 32. In the FIGS. 1 and 2 illustrations, as to combustion face 30 everything vertically below intersection 46 is part of combustion bowl 32, and everything vertically above intersection 46 is part of rim 40.

Outer bowl surface 36 further defines a large radius of curvature 130 adjacent inner bowl surface 34, and a medium radius of curvature 120 adjacent wall surface 38. Lip surface 44 defines a small radius of curvature 110, each of the large, medium and small radiuses of curvature being in a longitudinal section plane that includes longitudinal axis 100. It will be recalled that outer bowl surface 36 has a compound curvature increased in sharpness in a radially outward direction. This may be understood to mean that outer bowl surface 36 does not curve at a continuous rate, but instead has a changing rate of curvature, and begins to curve more sharply as surface 36 approaches wall surface 38. Inner bowl surface 34, outer bowl surface 36, and wall surface 38 together contour combustion bowl 32 such that a diameter of combustion bowl 32 is about 124 mm and a volume of combustion bowl 32 is about 190 cm³ so as to establish a bowl to bore ratio of about 0.71 and a compression ratio of 15:1 to 17:1 when piston 20 is installed for service in engine 8. The significance of contouring combustion bowl 32, and in particular how relative sizing and shaping of the various surfaces of combustion face 30 attains a predefined bowl to bore ratio and bowl volume, as well as compression ratio, will be further apparent from the following description.

In a practical implementation strategy, outer bowl surface 36 has a bottom section 48 adjoining inner bowl surface 34 and defining large radius of curvature 130. Outer bowl surface 36 also may have a transition section 50 extending from bottom section 48 to wall surface 38 and defining medium radius of curvature 120. Large radius of curvature 130 may be about twice medium radius of curvature 120, and medium radius of curvature 120 may be about five times small radius of curvature 110. As noted above, rim 40 may include planar rim surface 42. Surface 42 may define a plane, and bottom section 48 of combustion bowl 32 may be at a depth 195 from the plane. Depth 195 may be greater than medium radius of curvature 120 and less than large radius of curvature 130. In a further practical implementation strategy, large radius of curvature 130 may be about 24 mm. Medium radius of curvature 110 may be about 12 mm, and depth 195 may be about 20 mm. In conjunction with a shape of inner bowl surface 34, radiuses 120 and 130, and depth 195 are geometric attributes principally affecting combustion bowl volume, diameter, and thus bowl diameter to cylinder bowl ratio and compression ratio in engine 8. Inner bowl surface 34 may also define a cone angle 200 in the longitudinal section plane of about 137°, and bowl volume may be about 194 cm³. More particularly still, depth 195 may be about 19.6 mm, and bowl volume may be about 193.5 cm³. Bowl diameter may be about 124.25 mm such that the ratio of bowl diameter 145 to cylinder bore diameter 105 is 0.71.

Additional features of piston 20 relate to a height 115 of wall surface 38, and positioning and radius size relating to lip surface 44. In a practical implementation strategy, height 115 may be from about 2 mm to about 3 mm, and lip surface 44 may descend an axial distance or rim depth 125 from planar rim surface 42 of about 3 mm or less. The small radius of curvature 110 defined by rim surface 44 may be about 3 mm or less. In contrast to the non-uniform, changing curvature of outer bowl surface 36, a curvature of lip surface 44 may be uniform. A diameter 165 of rim 42 between outer body surface 28 and lip surface 44 may be about 25 mm. As also noted above, inner bowl surface 34 defines cone angle 200. Fuel injector 18 may include injector spray orifices formed therein, numbering seven, which define an injector spray angle 300. Injector spray angle 300 is greater than cone angle 200, and typically spray angle 300 and cone angle 200 will differ by about 10° or greater. In a practical implementation strategy, cone angle 200 is about 137° and spray angle 300 is about 150°. In a further aspect relating to operation of engine 8, fuel injection timing may be such that fuel spray commences 20° to 30° before a top dead center position and continues to 20° to 30° after top dead center, and in a practical implementation may commence at 15° before top dead center and terminate at 20° after top dead center, or less.

Engine 8 is also shown in FIG. 1 having an exhaust recirculation loop 6, configured to return exhaust gases from exhaust passage 16 to intake passage 14 in a conventional manner. In other embodiments, no exhaust gas recirculation will be used. Engine 8 may also have a low swirl ratio, such that intake gases will swirl about cylinder 54 generally in a direction of rotation which is circumferentially around longitudinal axis 100 of piston 20. The swirl ratio may be significantly lower than certain other known engine system designs, and in a practical implementation strategy the swirl ratio, defined as a ratio of the rate of swirling of intake gases and RPM of the engine may be less than 1, and typically less than about 0.5. Engine 8 also might be equipped with a common rail fuel system supplying pressurized liquid fuel to fuel injector 18, and such other injectors as will likely be used in connection with additional cylinders and pistons of engine 8.

In view of the foregoing description, it will be appreciated that a number of different dimensional, geometric and proportional attributes of piston 20 can, in conjunction with other features of engine 8, provide a desired combustion bowl diameter to cylinder bore diameter ratio, or "bowl to bore ratio," a desired bowl volume, and a desired compression ratio. An overall combustion bowl shape conducive to reduced emissions, at least under certain operating conditions and engine design strategies, is also achieved. Table 1 below includes example values for various of these dimensional, proportional, and geometric attributes in comparison with three known engine systems. The present engine 8 and piston 20 are represented in the column under the heading Engine 8. Engine I, engine II and engine III are represented in additional columns in Table 1, and as noted above are each known piston and engine combinations. It may be noted that each of engines I, II and III are 175 mm bore engines. Bowl to bore ratios in engines I, II, and III range from 0.691 to 0.714. It may also be noted from Table 1 that many of the parameters discussed herein in connection with engine 8 and piston 20 appear relatively close in value, magnitude or degree to those of engines I, II and III. The distinctions are, however, non-trivial, particularly given that research and development of test data was required to provide certain initial target specifications respecting piston 20 and engine 8, and then additional conceptual and practical fitting together and modification of various features of pistons was required to develop the present disclosure.

Another way to understand the aspects of piston design that gave rise to piston 20 and engine 8 is that engine and piston parameters which are considered likely to achieve desired emissions goals can be developed through testing and/or observations of new and known designs, an undertaking that can vary from relatively straight forward to very difficult. Adding to that burden, however, can be the actual implementation, typically non-intuitive, and often successfully attained only by engineering judgment, as to what parts can fit where, and what sort of features can be combined and which cannot, to arrive at a practicable design not necessitating a redesign of the entire engine. In addition to the features specifically discussed above, Table 1 also sets forth characteristics such as a distance 175 from the rim plane to the top of wall 38, distances 185 and 187 from rim plane to centers of circles defined by radiuses 120 and 130, respectively, and distances 155 and 157 between centers of circles defined by radiuses 120 and 130, respectively. Table 1 sets forth values for these various attributes. It can be expected that some departure from the specific values for Engine 8 and piston 20 will be tolerable, however, in many instances pistons and engines according to the present disclosure will have features precisely as set forth in Table 1 within a relatively modest margin of error.

To that end, as used herein, the term "about" can be understood in the context of conventional rounding to a consistent number of significant digits. Accordingly "about 0.71" should be understood to mean from 0.705 to 0.714. "About 137°" means from 136.5° to 137.4°. "About 124 mm" means from 123.5 mm to 124.4 mm, "about 124.25 mm" means from 124.245 mm to 124.254 mm, and so on. In the case of terminal zeros, such as the zero in 190 cm³, the term "about" would be understood to mean the pertinent quantity can be from 185 cm³ to 194 cm³. Where the term "about" is not used, a lesser degree of rounding up or rounding down is appropriate.

TABLE 1

| Symbol | Parameter | Engine 8 | Engine I | Engine II | Engine III |
|---|---|---|---|---|---|
| 110 | Bowl Rim/Edge Radius | 2.6 mm | 2.6 mm | 3 mm | 2 mm |
| 120 | Bowl Radius and Location | 12.2 mm | 12.2 mm | 16.5 mm | 19 mm |
| 130 | Bowl Radius and Location | 24 mm | 24 mm | 25.5 mm | none |
| 105 | Cylinder Bore Diameter | 175 mm | 175 mm | 175 mm | 175 mm |
| 115 | Height of Wall | 2.576-2.776 | 2.274 | 1.044 | 5.7 |
| 125 | Bowl Rim Depth | 2.6 | 2.6 | 3 | 2 |
| 135 | Cone Depth | 6.5 | 6.2 | 6.2 | 6.2 |
| 145 | Bowl Diameter | 124.25 mm | 121 mm | 125 mm | 125 mm |
| 155, | Distance Between Centers of Circles Defined By | 99.85, 86.63 | 96.6, 80.5128 | 92, 81.58 | 87 |

TABLE 1-continued

| Symbol | Parameter | Engine 8 | Engine I | Engine II | Engine III |
|---|---|---|---|---|---|
| 157 | radius 120 and radius 130 | | | | |
| 165 | Rim Diameter | 24.5 | 26.01 | 24.01 | 24.01 |
| 175 | Distance From Rim Plane To Top of Vertical Wall | 2.6 | 2.6 | 3 | 2 |
| 185, 187 | Distance From Rim Plane to Centers of Circles Defined by radius 120 and radius 130(parentheses used where centers are above Rim Plane) | 5.376 (4.4) | 4.874 (3.76) | 4.045 (3.295) | 7.7 |
| 195 | Bowl Depth | 19.6 | 20.25 | 22.2 | 26.7 |
| 200 | Cone Angle | 137° | 127° | 121° | 115° |
| 300 | Injector Spray Angle | 150° | 130° | 130°, 135° | 130° |
| | Bowl to Bore Ratio | 0.71 | .691 | .714 | .714 |
| | No. of Injector Orifices | 7 | 7 | 7 | 7 |
| | Bowl Volume | 193.5 cm$^3$ | 187.8 cm$^3$ | 219.7 cm$^3$ | 262.1 cm$^3$ |
| | Compression Ratio | 15:1-17:1 | 16.7:1 | 15.3:1 | 14.2:1 |

INDUSTRIAL APPLICABILITY

Figure 3:
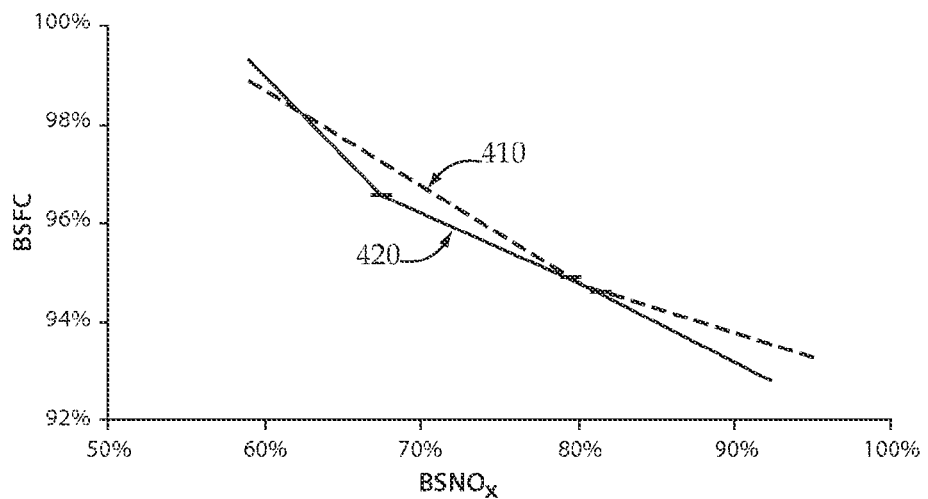
FIG. 3 is a graph of BSFC versus BSNOx comparing two different pistons in a single cylinder test engine.
Figure 4:
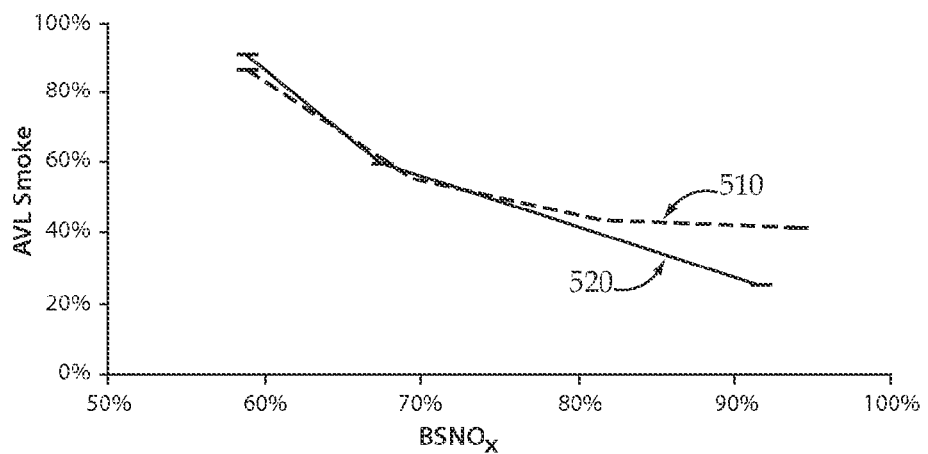
FIG. 4 is a graph of AVL smoke versus BSNOx for the two pistons in a test engine.

Referring now to FIG. 3, there is shown a graph of brake specific fuel consumption (BSFC) on the y-axis in comparison with brake specific NOx (BSNOx) production on the x-axis, for a single cylinder test engine using a piston providing a 71% or 0.71 bowl to bore ratio in curve 420, and a piston sized to provide a 73% or 0.73 bowl to bore ratio in curve 410. It may be noted that the 71% bowl to bore ratio piston represented via curve 420 is superior in certain respects to that shown via curve 410, and provides a more advantageous fuel or combustion efficiency to NOx production trade-off than the piston sized for 73%. Referring also to FIG. 4, there is shown AVL smoke versus BSNOx, again for a piston configured to provide a 71% or 0.71 bowl to bore ratio in curve 520 versus a 73% or 0.73 bowl to bore ratio in curve 510. Among other things, the data for the 71% piston demonstrates a greater range over which both smoke and NOx are reduced.

As noted above, general target specifications for a piston and/or engine can be developed, and then the work of fitting together parts and/or features, and modifying or building upon existing pistons and engines can commence to achieve those target specifications. Such was generally the manner in which piston 20 was developed, and achieving the desired bowl to bore ratio of about 0.71, or even better exactly 0.71 within measurement error, was a primary consideration. Compression ratio of 15:1 to 17:1, and potentially more narrowly being 16.5:1, was also a significant factor. Beginning with test data favoring a bowl to bore ratio of about 0.71, options for obtaining that bowl to bore ratio, along with properties considered favorable to reduced NOx and/or reduced smoke without sacrificing efficiency, or requiring engine redesign, were then explored. Such other properties include, for instance, the bowl being non-reentrant, spray angle being larger than cone angle, a relatively sharp lip between the bowl and piston rim, and the bowl transitioning as smoothly as possible from its bottom up to the piston rim. Certain aspects of engine hardware can be much more challenging to modify than others. Bore size is one example. Obviously, changing bore size in an engine to obtain a 0.71 bowl to bore ratio would not likely be considered a practical solution. Changing a compression ratio of an engine, either intentionally or as a consequence of modifying other features, may also be generally undesirable, and could even have direct effects on ignition properties and/or emissions themselves. A particular engine platform may therefore provide fixed, or substantially fixed external constraints to the piston design process. It will therefore be appreciated by those skilled in the art that the present disclosure provides a piston and engine strategy which accounts for a great many different design considerations, potentially cross-coupled and non-linear relationships, and achieves a target bowl to bore ratio, while enabling certain overall engine platform features such as compression ratio to remain unchanged.

The present description is for illustrative purposes only, and should not be construed to narrow the breadth of the present disclosure in any way. Thus, those skilled in the art will appreciate the various modification might be made to the presently disclosed embodiments without departing from the full and fair scope and spirit of the present disclosure. Other aspects, features and advantages will be apparent upon an examination of the attached drawings and appended claims.

What is claimed is:

1. A piston for balancing combustion efficiency and smoke generation with NOx production in a direct injection compression ignition internal combustion engine having a cylinder bore of about 175 mm, the piston comprising:

a piston body defining a longitudinal axis extending between a first axial body end and a second axial body end, and including an outer body surface extending between the first and second axial body ends, and a combustion face upon the first axial body end;

the combustion face forming a combustion bowl and including a conical inner bowl surface, and a concave outer bowl surface extending from the inner bowl surface to a cylindrical wall surface and having a compound curvature increased in sharpness in a radially outward direction;

the combustion face further forming an annular piston rim extending circumferentially around the combustion bowl, and including a planar rim surface, and a convex lip surface transitioning between the rim surface and the wall surface and having an intersection with the wall surface that defines a boundary of the combustion bowl; and the outer bowl surface defining a large radius of curvature adjacent the inner bowl surface, and a medium radius of curvature adjacent the wall surface, and the lip surface defining a small radius of curvature, each in a longitudinal section plane, and the inner bowl, outer bowl, and wall surfaces together contouring the combustion bowl, such that a diameter of the combustion bowl is about 124 mm and a volume of the combustion bowl is about 190 cm$^3$ so as to establish a bowl to bore ratio of about 0.71 and a compression ratio of 15:1 to 17:1 when the piston is installed for service in the internal combustion engine, wherein the outer bowl surface has a bottom section adjoining the inner bowl surface and defining the large radius of curvature, and a transition section extending from the bottom section to the wall surface and defining the medium radius of curvature and wherein the large radius of curvature is about twice the medium radius of curvature, and the medium radius of curvature is about five times the small radius of curvature.

2. The piston of claim 1 wherein the planar rim surface defines a plane, and the bottom section of the combustion bowl is at a depth from the plane greater than the medium radius of curvature and less than the large radius of curvature.

3. The piston of claim 2 wherein the large radius of curvature is about 24 mm, the medium radius of curvature is about 12 mm, and the depth is about 20 mm.

4. The piston of claim 3 wherein the inner bowl surface defines a cone angle in the longitudinal section plane of about 137°, and the bowl volume is about 194 cm$^3$.

5. The piston of claim 4 wherein the depth is about 19.6 mm, and the bowl volume is about 193.5 cm$^3$.

6. The piston of claim 4 wherein a height of the cylindrical wall is from about 2 mm to about 3 mm, the lip surface descends an axial distance from the planar rim surface of about 3 mm or less, and the small radius of curvature is about 3 mm or less.

7. The piston of claim 6 wherein a curvature of the lip surface defining the small radius of curvature is uniform, and a diameter of the rim surface between the outer body surface and the lip surface is about 25 mm.

8. The piston of claim 3 wherein the bowl diameter is 124.25 mm such that the bowl diameter to cylinder bore diameter ratio is 0.71.

9. A direct injection compression ignition internal combustion engine comprising:
   an engine housing defining a cylinder bore having a cylinder bore diameter of about 175 mm, and including an intake passage and an exhaust passage each being in fluid communication with the cylinder bore;
   a cylinder head coupled with the engine housing;
   a fuel injector mounted in the cylinder head and configured to directly inject a fuel into the cylinder;
   a piston positioned within the cylinder bore and including a piston body defining a longitudinal axis extending between a first axial body end and a second axial body end, and including an outer body surface extending between the first and second axial body ends, and a combustion face upon the first axial body end;
   the combustion face forming a combustion bowl and including a conical inner bowl surface, and a concave outer bowl surface extending from the inner bowl surface to a cylindrical wall surface and having a compound curvature increased in sharpness in a radially outward direction;
   the combustion face further forming an annular piston rim extending circumferentially around the combustion bowl, and including a planar rim surface, and a convex lip surface transitioning between the planar rim surface and the wall surface and having an intersection with the wall surface that defines a boundary of the combustion bowl; and
   the outer bowl surface defining a large radius of curvature adjacent the inner bowl surface, and a medium radius of curvature adjacent the wall surface, and the lip surface defining a small radius of curvature, each in a longitudinal section plane, and the inner bowl, outer bowl, and wall surfaces together contouring the combustion bowl, such that a ratio of a diameter of the combustion bowl to the bore diameter is about 0.71, and a volume of the combustion bowl is about 190 cm$^3$ to yield a compression ratio in the internal combustion engine of 15:1 to 17:1, wherein the large radius of curvature is about twice the medium radius of curvature, and the medium radius of curvature is about five times the small radius of curvature and wherein the large radius of curvature is about 24 mm, and the medium radius of curvature is about 12 mm.

10. The engine of claim 9 wherein the planar rim surface defines a plane, and the bottom section of the combustion bowl is at a depth from the plane greater than the medium radius of curvature and less than the large radius of curvature.

11. The engine of claim 10 wherein the depth is about 20 mm and the bowl volume is about 194 cm$^3$.

12. The engine of claim 9 wherein the inner bowl surface defines a cone angle in the longitudinal section plane and which differs from the spray angle by about 10° or greater.

13. The engine of claim 12 wherein the cone angle is about 137°, and the spray angle is about 150°.

14. The piston of claim 9 wherein the bowl diameter is 124.25 mm such that the bowl diameter to cylinder bore diameter ratio is 0.71.

* * * * *